United States Patent
Rahman

(10) Patent No.: US 11,483,886 B2
(45) Date of Patent: Oct. 25, 2022

(54) STAGGERED IMS BEARER ACTIVATION AND RADIO BEARER ACTIVATION IN 5G NON-STANDALONE NETWORKS

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/231,320

(22) Filed: Dec. 21, 2018

(65) Prior Publication Data

US 2020/0205212 A1 Jun. 25, 2020

(51) Int. Cl.
| | |
|---|---|
| *H04W 76/15* | (2018.01) |
| *H04W 60/00* | (2009.01) |
| *H04W 88/06* | (2009.01) |
| *H04L 65/1016* | (2022.01) |
| *H04L 65/1069* | (2022.01) |

(Continued)

(52) U.S. Cl.
CPC ......... *H04W 76/15* (2018.02); *H04L 65/1016* (2013.01); *H04L 65/1069* (2013.01); *H04W 8/02* (2013.01); *H04W 60/005* (2013.01); *H04W 74/0816* (2013.01); *H04W 88/06* (2013.01); *H04W 76/12* (2018.02)

(58) Field of Classification Search
CPC ....... H04W 76/15; H04W 8/02; H04W 88/06; H04W 74/0816; H04W 60/005; H04W 36/00; H04W 76/19; H04W 40/36; H04W 76/12; H04W 60/00; H04L 65/1016; H04L 65/1069; H04L 65/1033; H04L 65/80

See application file for complete search history.

(56) References Cited

U.S. PATENT DOCUMENTS

| | | | |
|---|---|---|---|
| 9,462,525 B1 * | 10/2016 | Malhotra | H04W 76/15 |
| 9,906,992 B1 * | 2/2018 | Youtz | H04W 36/18 |

(Continued)

FOREIGN PATENT DOCUMENTS

| | | |
|---|---|---|
| KR | 20150138367 A | 12/2015 |
| WO | WO2016122589 A1 | 8/2016 |

OTHER PUBLICATIONS

A book on "5G Non Standalone Solution Guide, StarOS Release 21.5," published Apr. 6, 2018.*

(Continued)

*Primary Examiner* — Nishant Divecha
(74) *Attorney, Agent, or Firm* — Lee & Hayes, P.C.

(57) ABSTRACT

Devices, systems, and methods relate to performing Internet Protocol (IP) Media Subsystem (IMS) bearer activation and radio bearer activation at different times. In some embodiments, a radio bearer is activated after the IMS bearer is activated. The radio bearer that is activated after the IMS bearer is activated may utilize a different Radio Access Technology (RAT) than an initial radio bearer. In certain instances, a device initiates activation of the radio bearer upon receiving confirmation that the IMS bearer is activated, or initiates activation of the radio bearer a predetermined period of time after initiating activation of the IMS bearer. In various embodiments, staggered IMS bearer activation and radio bearer activation can prevent collisions at components of an Evolved Packet Core (EPC).

17 Claims, 9 Drawing Sheets

(51) Int. Cl.
*H04W 76/12* (2018.01)
*H04W 8/02* (2009.01)
*H04W 74/08* (2009.01)

(56) References Cited

U.S. PATENT DOCUMENTS

| | | | | |
|---|---|---|---|---|
| 10,334,485 | B2* | 6/2019 | Chandramouli | H04W 36/0083 |
| 10,541,768 | B2* | 1/2020 | Su | H04J 1/08 |
| 2014/0079022 | A1* | 3/2014 | Wang | H04W 36/22 |
| | | | | 370/331 |
| 2015/0296559 | A1 | 10/2015 | Liu et al. | |
| 2017/0208488 | A1* | 7/2017 | Hwang | H04W 64/003 |
| 2017/0215105 | A1* | 7/2017 | Tan Bergstrom | H04W 48/18 |
| 2018/0109972 | A1 | 4/2018 | Kim et al. | |
| 2018/0343697 | A1* | 11/2018 | Hsu | H04L 5/0091 |
| 2019/0141521 | A1* | 5/2019 | Abe | H04W 12/02 |

OTHER PUBLICATIONS

An article on "Protocol signaling procedure in LTE" by Rao et al. published Apr. 28, 2010.*
Huawei et al., "Handover of deactivated PDU session to 4G", S2-1810484, #GPP TSD-SA WG2 Meeting #129, Dongguan, PR Chine, Oct. 9, 2018, pp. 1-6.
PCT Search Report and Written Opinion dated Apr. 27, 2020 for PCT Application No. PCT/US2019/065215, 9 pages.

* cited by examiner

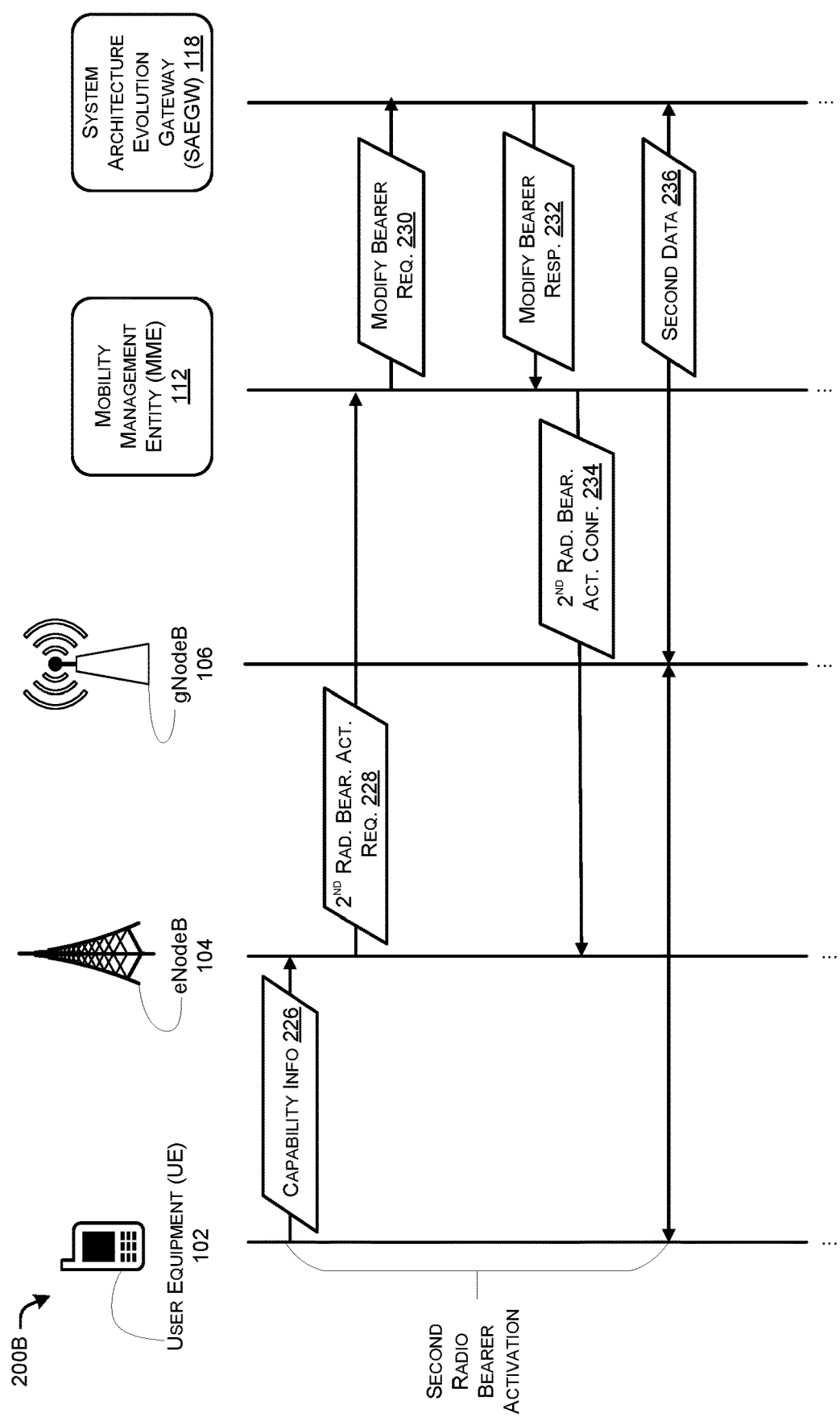

STAGGERED IMS BEARER ACTIVATION AND RADIO BEARER ACTIVATION IN 5G NON-STANDALONE NETWORKS

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies to provide improved bandwidth and decreased response times to a multitude of devices that may be connected to a network.

5G technologies can be deployed using Standalone (SA) networks and/or Non-Standalone (NSA) networks. NSA networks, for example, can deliver services using 5G-specific radio resources while utilizing at least some 4G infrastructure.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 2A and 2B illustrate example signaling between elements of the system illustrated in FIG. 1.

DETAILED DESCRIPTION

Figure 1:
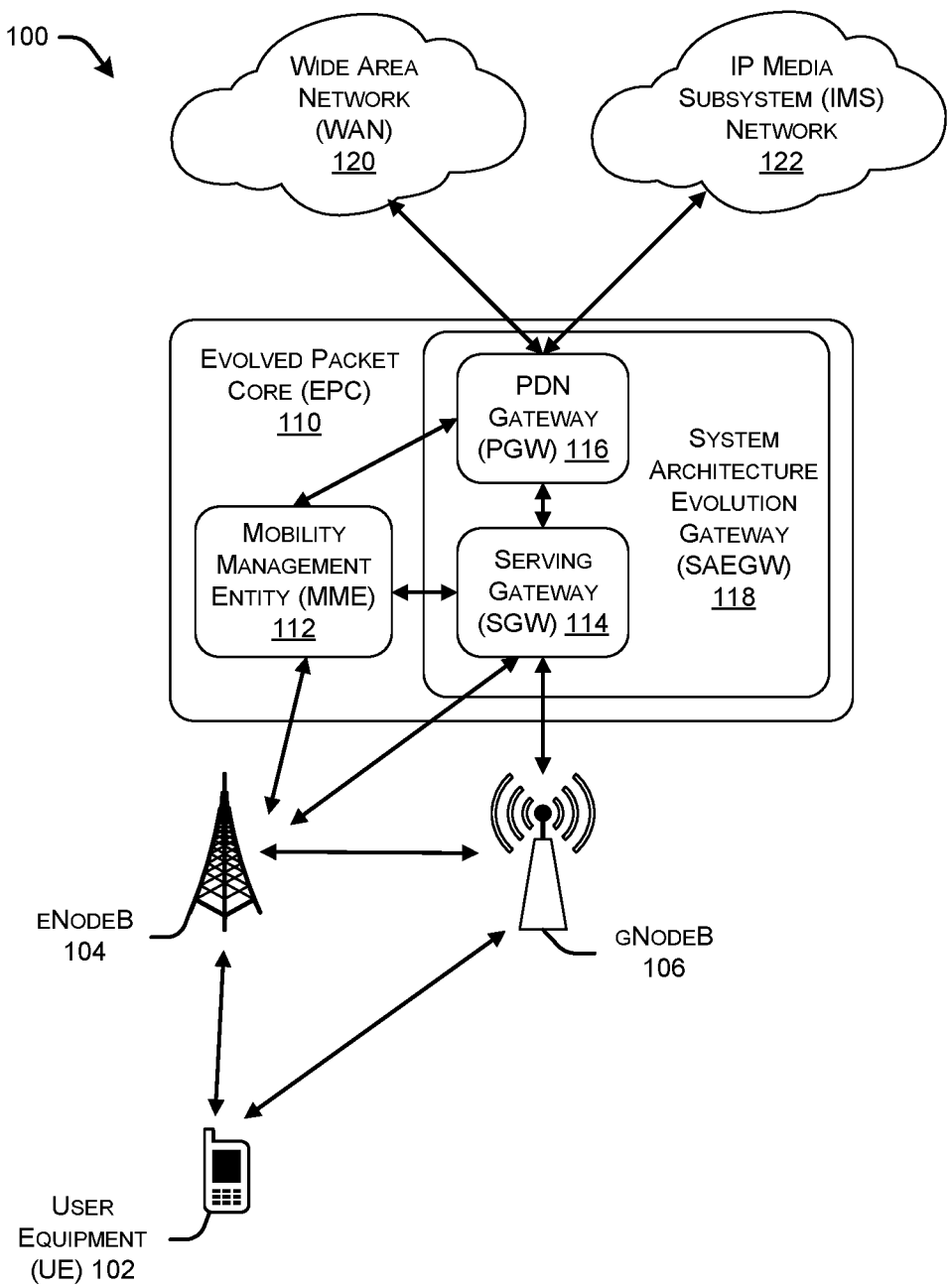
FIG. 1 is a diagram illustrating a Non-Standalone (NSA) network according to an embodiment of the present disclosure.

The systems, devices, and techniques described herein relate to Non-Standalone NSA) fifth generation (5G) networks that perform default Internet Protocol (IP) Multimedia Subsystem (IMS) Evolved Packet System (EPS) bearer activation and 5G radio bearer activation at different times.

5G technologies can provide better throughput, lower latency, and new forms of wireless communication. In order to achieve these advantages, many 5G technologies must be implemented using higher frequency radio resources than previous technologies (e.g., fourth generation (4G) technologies). Accordingly, a significant amount of new hardware may need to be deployed in order to make 5G coverage as available as previous radio technologies.

Such deployment of hardware requires significant cost, and other resources, such as space. In order to spread out the cost of deploying 5G technology over time, and to reduce the overall costs associated with setting 5G networks, intermediary deployments of 5G have been proposed. These intermediate deployments include NSA deployments, in which 5G networks utilize existing 4G architecture. One such NSA deployment is referred to by 3GPP as "Option 3X."

One example of an Option 3X network includes a master base station and a slave base station that are independently connected to an Evolved Packet Core (EPC). The master base station can relay data between a device and the EPC using a 4G Radio Access Technology (RAT) but may be incapable of directly transmitting or directly receiving data wirelessly using a 5G New Radio (NR) RAT. For example, the master base station may not have been designed to use the 5G NR RAT and may lack transceivers capable of transmitting or receiving wireless data in a 5G-specific frequency range (e.g., 24 GHz-52 GHz). However, the master base station can control the slave base station to relay data between the device and the EPC using the 5G NR RAT. In particular, the master base station can cause the EPC to transfer a radio bearer from the master base station to the slave base station, or to add a radio bearer including the slave base station, so that the slave base station can relay data between the device and a network (e.g., a Wide Area Network (WAN) and/or an Internet Protocol (IP) Media Subsystem (IMS) network) using a pre-established tunnel through the EPC. As a result, 5G-capable devices in the example Option 3X network can receive services using the 5G NR RAT.

One problem with Option 3X networks, as well as other NSA networks, is that in the processes of activating the IMS bearer and the radio bearer including the slave base station, a component of the EPC (e.g., a Mobile Management Entity (MME), a Serving Gateway (SGW), and/or a Packet Data Network (PDN) Gateway (PGW)) can receive different messages concerning the same end user device at substantially the same time. This can cause whet is referred to as a "collision." For example, the component can receive a first packet, corresponding to IMS bearer activation for a device, at substantially the same time as a second packet, corresponding to a process of transferring the bearer context for the device to a different radio technology, and the component may not be able to distinguish between the two packets. When packets collide at a component of the EPC, the component may ignore one of the packets.

If the component of the EPC disregards the second packet corresponding to the radio bearer activation process, for example, 5G-capable device may be prevented or delayed from receiving 5G radio services. Users, who may have paid a premium to obtain 5G-capable devices, may be particularly dissatisfied with only being able to access 4G services when 5G services should be available. The problem of devices not being able to access available services (e.g., available 5G services) that they are capable of receiving (e.g., via a 5G NR RAT) is known to those skilled in the art as "leakage," and should be avoided where possible.

Embodiments of the present disclosure address these problems by performing IMS bearer activation and 5G NR RAT radio bearer activation at different times. In some embodiments, the master base station waits to initiate 5GNR RAT radio bearer activation until it determines that IMS bearer activation is complete. In some examples, the device itself refrains from informing the master base station that the device is 5G-capable until after IMS bearer activation is complete, in order to ensure that the master base station waits to initiate the 5G NR RAT radio bearer activation until IMS bearer activation is complete. By staggering, in time, the IMS bearer activation and the radio bearer activation processes, signaling collisions in the EPC can be prevented.

Various embodiments improve the technical field of wireless communication by preventing signaling collisions at components of an EPC in NSA 5G networks. Embodiments also improve the technical field of wireless communication by ensuring that 5G-capable devices receive 5G services in NSA 5G networks. These and other improvements to the functioning of a computer and network are discussed herein.

The systems, devices, and techniques described herein can be implemented in a number of ways. In general, the techniques discussed herein may be implemented in any dual connectivity or multi connectivity environment and are not limited to second generation (2G), third generation (3G), 4G, and/or 5G environments. Example implementations are provided below with reference to the following figures.

FIG. 1 is a diagram illustrating a Non-Standalone (NSA) network 100 according to an embodiment of the present disclosure. The network 100 includes a User Equipment (UE) 102, which can be connected to an eNodeB 104 and/or an gNodeB 106. The eNodeB 104 and the gNodeB 106 can independently provide services between the UE 102 and a Wide Area Network (WAN) 120 or an Internet Protocol (IP) Media Subsystem (IMS) network 122 via an Evolved Packet Core (EPC) 110.

The terms "user equipment (UE)," "user device," "wireless communication device," "wireless device," "communication device," "mobile device," and "client device," can be used interchangeably to describe any UE that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 702.1x protocols, WiMAX, Wi-Fi, Data Over Cable Service Interface Specification (DOCSIS), Digital Subscriber Line (DSL), CBRS, and/or any future IP-based network technology or evolution of an existing IP-based network technology. Examples of UEs can include, but are not limited to, smart phones, mobile phones, cell phones, tablet computers, portable computers, laptop computers, Personal Digital Assistants (PDAs), electronic book devices, or any other portable electronic devices that can generate, request, receive, transmit, or exchange voice, video, and/or digital data over a network. Additional examples of UEs include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

The term "eNodeB," and its equivalents, may refer to a base station configured to transmit and receive wireless data over 4G-specific frequency bands. An eNodeB may be configured to transmit and receive data using a 4G Radio Access Technology (RAT). That is, an eNodeB may be configured to transmit and receive data wirelessly over one or more channels in a 4G-specific range of electromagnetic frequencies.

The term "4G-specific," and its equivalents, may refer to a technology that is utilized in the fourth generation of broadband cellular network technology, such as in the Long Term Evolution (LTE) standard. For example, a "4G-specific frequency band" may be an LTE band. In some instances, a 4G-specific technology can be utilized in another generation of broadband cellular network technology, such as 5G technology.

The term "gNodeB," and its equivalents, may refer to a base station configured to transmit and receive wireless data over 5G New Radio (NR)-specific frequency bands. In some instances, one or more slave gNodeBs can be controlled by a master eNodeB. A gNodeB may be configured to utilize a 5G NR RAT. That is, an eNodeB may be configured to transmit and receive data wirelessly over one or more channels in a 4G-specific range of electromagnetic frequencies.

The term "5G-specific," and its equivalents, may refer to a technology that is utilized in the fifth generation of broadband cellular network technology, such as in the NR standard, but is not utilized in the fourth generation of broadband cellular network technology, such as in the LTE standard. For example, a "5G-specific frequency band" may be GHz frequency band that is not utilized in the LTE standard.

The terms "base station," "Access Point (AP)," or their equivalents, can refer to one or more devices that can provide wireless services to one or more UEs in a coverage area. For example, a base station can be implemented as a variety of technologies to provide wired and/or wireless access to the network, as discussed herein. In some instances, a base station can include a 3GPP RAN, such a GSM/EDGE RAN (GERAN), a Universal Terrestrial RAN (UTRAN), an evolved UTRAN (E-UTRAN), an eNodeB, a gNodeB, or alternatively, a "non-3GPP" RAN, such as a Wi-Fi RAN, or another type of wireless local area network (WLAN) that is based on the IEEE 702.11 standards. Further, a base station can include any number and type of transceivers and/or base stations representing any number and type of macrocells, microcells, picocells, or femtocells, for example, with any type or amount of overlapping coverage or mutually exclusive coverage.

The term "Wide Area Network (WAN)," and its equivalents, can refer to a telecommunications and/or computer network that extends over a relatively large geographical distance. The Internet is an example of a WAN.

The term "Internet Protocol (IP) Media Subsystem (IMS)," and its equivalents, can refer to an architectural framework over which voice or other multimedia services can be provided to UEs, such as mobile phones. An IMS network can include multiple functions, such as Call Session Control Functions (CSCFs), that are used to process signaling packets in the IMS network. For example, an IMS network can include a Proxy CSCF (P-CSCF), which can be a destination for data packets (e.g., Session Initiation Protocol (SIP) packets) sent by a UE seeking services from the IMS network. In examples, the CSCFs may further include an Interrogating-CSCF (I-CSCF), a Serving-CSCF (S-CSCF). In various embodiments, the IMS network may further include any of a Home Subscriber Server (HSS), a Subscription Locator Function (SLF), a Media Resource Function (MRF), a Break Out Gateway Control Function (BGCF), In some implementations, an IMS network supports services Public Switched Telephony Network (PSTN) Gateway(s), Application Server(s), IP Multimedia Serving Switch Function (IM-SSF), and Service Layer Interfaces. The IMS network may provide particular services, such as Voice over Internet Protocol (VoIP) services. When services to and from an IMS are also traverse an EPC, VoIP services can include Voice over LTE (VoLTE) services. In various implementations, an IMS network is managed by a carrier organization.

The terms "Evolved Packet Core (EPC)," and its equivalents, can refer to a core network of the LTE standard. An EPC may have an all-IP architecture, with separation of control plane and user plane traffic. The EPC can include a Mobility Management Entity (MME), a Serving Gateway (SGW), a Packet Data Network (PDN) Gateway (PGW), a Home Subscriber Server (HSS), an Access Network Discovery and Selection Function (ANDSF), and an Evolved Packet Data Gateway (ePDG). An EPC may relay data exchanged between an access point (e.g., a base station, an eNodeB, a gNodeB, etc.) and a WAN.

The EPC 110 of FIG. 1 includes an MME 112, an SGW 114, and a PGW 116. The SGW 114 and the PGW 116 can be collectively referred to as a System Architecture Evolution (SAE) Gateway. (SAEGW) 118. Although not illustrated, the EPC 110 can further include other elements, such as a Home Subscriber Server (HSS).

The MME 112 functions as a control node for the EPC 110. For example, the MME 112 may facilitate idle mode, bearer activation and deactivation, SGW selection, user authentication, and the like. In practice, an EPC may have multiple MMEs. The MME 112 may be responsible for signaling various elements of the EPC for mobility, security, and/or E-UTRAN access. In various embodiments, the MME 112 is responsible for selecting the SGW 114 among multiple candidate SGWs.

The SGW 520 functions as a communication gateway of the EPC 110. The SGW 520 is a data plane interface with LTE and NR base stations, such as eNodeB 104 and gNodeB 106, respectively. An EPC may have multiple SGWs. The SGW 114 may be responsible for transporting Internet Protocol (IP) data traffic between the UE 102 and an external network, e.g., WAN 120 and/or IMS network 122. In particular, the SGW 114 can carry data traffic between the PGW 116 and a base station, such as the eNodeB 104, the gNodeB 106, or both.

The PGW 116 may also transport the IP data traffic between the UE 102 and the WAN 120. The PGW 116 may carry data traffic between the SGW 114 and the WAN 120.

In various embodiments of the present disclosure, the UE 102 can access services from the WAN 120 by undergoing an initial attachment procedure. Initially, the UE 102 can transmit an attach request to the eNodeB 104. In turn, the eNodeB 104 can initiate the activation of a PDN bearer traversing the EPC 110 between the UE 102 and the WAN 120. For example, the PDN bearer may include an EPS bearer. The UE 102 and the eNodeB 104 may wirelessly communicate with each other using a first RAT, such as a 4G LTE RAT. The eNodeB 104 may therefore be part of a first radio bearer that is utilized by the EPS bearer to carry data to and from the UE 102.

The term "bearer," "tunnel," and their equivalents can refer to a path over which data is transmitted. A bearer can include one or more nodes.

A "PDN bearer," an "Internet bearer," an "EPS Internet bearer," and their equivalents, can refer to a data pathway that connects a UE and a PDN. A UE can connect to a PDN or WAN, such as the Internet, via the PDN bearer. In some instances, a PDN bearer can include an EPS bearer.

An "EPS bearer" can refer to a specific path through an EPC over which data can be transferred to and from a device. For example, an EPS bearer may include the SGW 114 and a PGW 116, which routes IP-related data traffic between the WAN 120 or the IMS network 122 and the UE 102. In some examples, the EPS bearer may further include, or at least utilize, one or more radio bearers including Radio Access Networks (RANs) that connect the UE 102 to the EPC 110, e.g., a base station such as eNodeB 104, gNodeB 106, or both.

A "radio bearer" can refer to a path including a wireless link over which data can be transferred to and from a device. A radio bearer may include a base station, such as any of an eNodeB, a gNodeB, and the like.

With reference to FIG. 1, the eNodeB 104 can initiate the creation of the PDN bearer and the EPS bearer for the UE 102 by forwarding the attach request to the MME 112. The MME 112, in turn, can initiate a process of selecting the SGW 114 and the PGW 116 for the EPS bearer.

Initially, the EPS bearer can include the SGW 114 and the PGW 116 selected by the MME 112. The EPS bearer can utilize, or can be associated with, a radio bearer including the eNodeB 104. In some cases, the eNodeB 104 can utilize the EPS bearer to transmit data between the UE 102 and the WAN 120. Data can be exchanged between the UE 102 and the WAN 120 via the PDN bearer, which includes the EPS bearer. Downlink services can be transmitted over the PDN bearer from the WAN 120, to the PGW 116, to the SGW 114, to the eNodeB 104, and then to the UE 102. Uplink services can be transmitted over the PDN bearer from the UE 102, to the eNodeB 104, to the SGW 114, to the PGW 116, and then to the WAN 120. The PDN bearer can enable the UE 102 to access the Internet, for example.

Next, or simultaneously during the creation of the PDN bearer, an IMS bearer can be generated. As used herein, the term "IMS bearer," and its equivalents, can refer to a pathway over which data can traverse between an IMS network and a UE. In some instances, an IMS bearer includes an EPS bearer.

Once the UE 102 is connected to the WAN 120 and the EPS bearer has been established, the UE 102 can transmit a request to connect to the IMS network 122 to the MME 112 via the eNodeB 104. In some instances, the request specifies an Access Point Name (APN) associated with the IMS network 122. In response, the MME 112 can set up an IMS bearer between the UE 102 and the IMS network 122 using the existing EPS bearer. For example, the MME 112 can initiate the creation of the IMS bearer by communicating with the SGW 114, the PGW 116, or both. In response, the SGW 114, the PGW 116, or both, can transmit a response to the MME 112 that informs the MME 112 of the IMS bearer. The MME 112 can then inform the UE 102 of the activated IMS bearer.

Once the IMS bearer has been activated for the UE 102, the UE 102 may be able to exchange services with the IMS network 122. In some instances, the activated IMS bearer allows the UE to receive voice services, such as Voice over LTE (VoLTE) services. The IMS bearer may include components of the original EPS bearer, which is included in the PDN bearer, but may connect to the IMS network 122 rather than (or in addition to) the WAN 120.

In some embodiments, the eNodeB 104 can learn that the UE 102 is 5G-capable from the attach request, or from some other message transmitted from the UE 102. The eNodeB 104 may be incapable of transmitting or receiving data using a 5G New Radio (NR) RAT. However, the gNodeB 106, which is controlled by the eNodeB 104, may be capable of transmitting and receiving data using the 5G NR RAT. In order to ensure that the UE 102 is provided 5G services, the eNodeB 104 may initiate activation of a second radio bearer including the gNodeB 106 and may initiate introducing the second radio bearer to the EPS bearer for the UE 102. The second radio bearer may be a 5G NR RAT radio bearer. In some cases, the EPS bearer may retain the first radio bearer that includes the eNodeB 104. That is, the EPS bearer may utilize both the first radio bearer (including the eNodeB 104) and the second radio bearer (including the gNodeB 106). In certain implementations, the first radio bearer may be excluded from the EPS bearer after the second radio bearer is activated, such that the EPS bearer is transferred from the first radio bearer to the second radio bearer.

The processes activating the IMS bearer and activating the second radio bearer may include transmitting and receiving various messages indicating the UE 102 between the MME 112, the SGW 114, and/or the PGW 116. If more than one of these messages is received by the same component of the EPC 110 (e.g., the MME 112, the SGW 114, or the PGW 116), a collision may occur.

In various embodiments, the eNodeB 104 waits to initiate activation of the second radio bearer including the gNodeB 106 until after the IMS bearer is created. The creation of the IMS bearer and the activation of the second radio bearer can be performed at different times, thereby preventing collisions in the EPC 110.

In some embodiments, the eNodeB may know that the UE 102 is 5G-capable before the IMS bearer is created. For example, the attach request transmitted from the UE 102 and received by the eNodeB 104 may inform the eNodeB 104 that the UE 102 is 5G-capable. In some instances, the eNodeB 104 may wait a predetermined period of time after initiating the creation of the PDN bearer or the IMS bearer before initiating the creation of the second radio bearer. The eNodeB 104 may, in certain instances, run a timer after forwarding the attach request to the MME 112. In some instances, the eNodeB 104 may initiate the activation of the second radio bearer in response to receiving an indication that the IMS bearer has been activated or created. This indication can comprise a message transmitted to the eNodeB 104 from the MME 112, the SGW 114, or the UE 102.

In some embodiments, the UE 102 may inform the eNodeB 104 that the UE 102 is 5G-capable after the IMS bearer is created. The UE 102 may download instructions to wait to inform the eNodeB 104 that the UE 102 is 5G-capable from an update, which can be provided by a carrier network, for example. In some instances, the UE 102 may wait a predetermined period of time after transmitting the attach request to the eNodeB 104 before transmitting an indication that the UE 102 is 5G-capable to the eNodeB 104. In some instances, the UE 102 may transmit an indication that the UE 102 is 5G-capable to the eNodeB 104 in response to receiving an indication that the IMS bearer has been activated. Accordingly, in some embodiments, the UE 102 can control the timing of the IMS bearer activation and the second radio bearer activation.

Once the second radio bearer including the gNodeB 106 has been activated for the UE 102, the EPS bearer can utilize the gNodeB 106 to transmit data to and from the UE 102. The EPS bearer may retain the SGW 114 and the PGW 116 selected during the initial EPS bearer creation process during the PDN bearer activation. As a result of the second radio bearer activation, downlink services can be provided along the PDN bearer from the WAN 120, to the PGW 116, to the SGW 114, to the gNodeB 106, and to the UE 102, and uplink services can be provided along the PDN bearer from the UE 102, to the gNodeB 106, to the SGW 114, to the PGW 116, and to the WAN 120. Similarly, as a result of the second radio bearer activation, downlink services can be provided along the IMS bearer from the IMS network 122, to the PGW 116, to the SGW 114, to the gNodeB 106, and to the UE 102, and uplink services can be provided along the IMS bearer from the UE 102, to the gNodeB 106, to the SGW 114, to the PGW 116, and to the IMS network 122. Accordingly, in various embodiments, activating the second radio bearer can enable the UE 102 to receive services from the WAN 120 (e.g., Internet browsing services) and/or from the IMS network 122 (e.g., VoLTE services) via the 5G NR RAT utilized by the gNodeB 106.

In some instances, the environment 100 can further include one or more communication servers to facilitate communications by and between the various devices in the environment 100. The WAN 120, for example, can include the one or more servers. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Thus, the environment 100 may implement GSM, UMTS, and/or LTE/LTE Advanced telecommunications technologies. The environment 100 may include, but is not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), MME(s), SGW(s), PGW (s), an evolved packet data gateway (e-PDG), an Internet Protocol (IP) Multimedia Subsystem (IMS), or any other data traffic control entity configured to communicate and/or route data packets between the UE 102, and one or more endpoints of the network (e.g., servers, websites, etc.), such as endpoints in WAN 120 or the IMS network 122.

While FIG. 1 illustrates the example environment 100, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

Figure 2A:
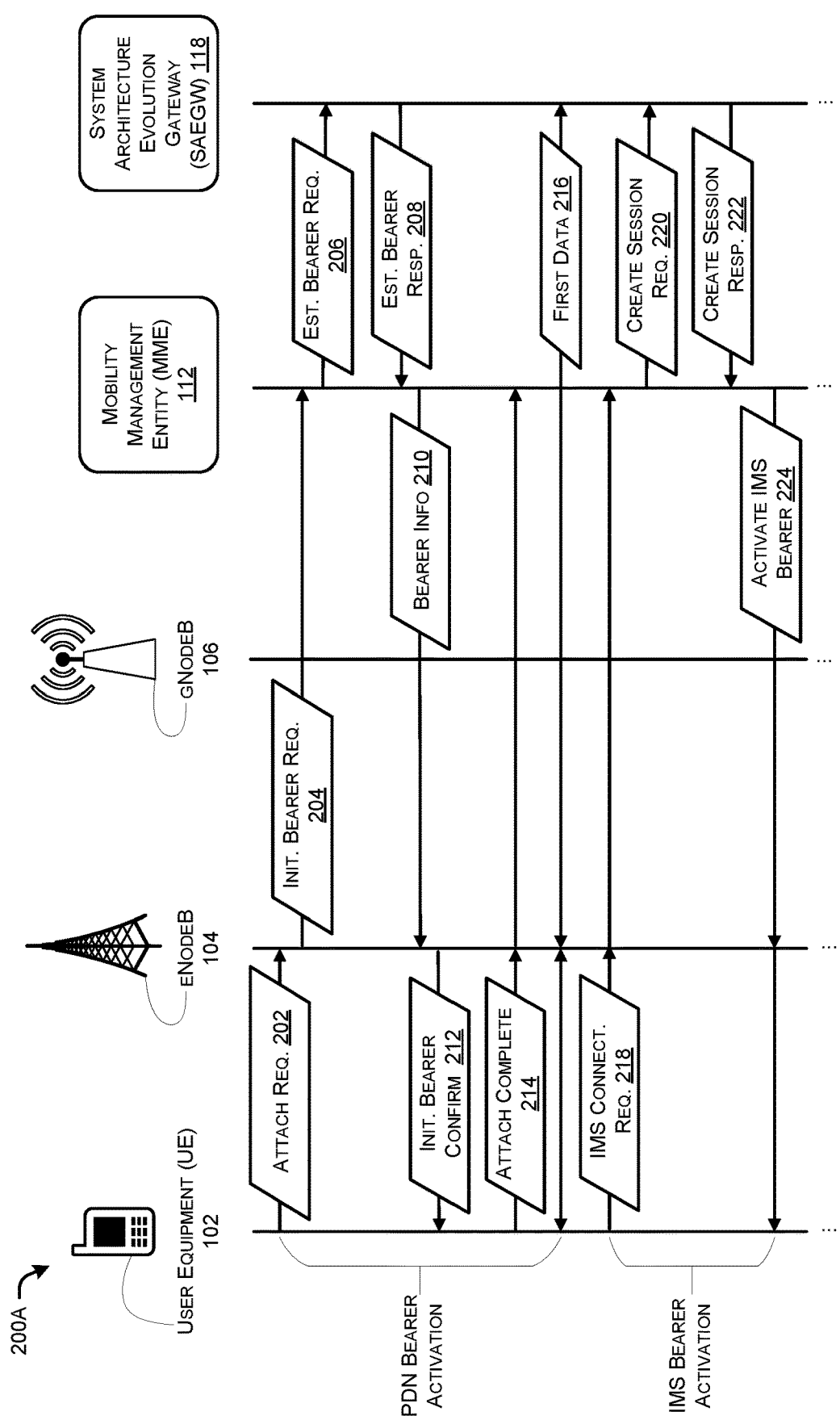

FIGS. 2A and 2B illustrate example signaling 200A and 200B between elements of the system 100 illustrated in FIG. 1. In particular, FIG. 2 illustrates signaling between the User Equipment (UE) 102, the eNodeB 104, the gNodeB 106, the Mobility Management Entity (MME) 112, and the System Architecture Evolution (SAE) Gateway (SAEGW) 118, according to some embodiments.

FIG. 2A illustrates signaling 200A for establishing a Packet Data Network (PDN) bearer and an (IP) Media Subsystem (IMS) bearer, according to embodiments.

Initially, the PDN bearer is activated. In various embodiments, the UE 102 may transmit an attach request 202 to the eNodeB 104. The UE 102 may transmit the attach request 202 to the eNodeB 104 upon entering or being activated in a coverage area associated with eNodeB 104. In some embodiments, the UE 102 transmits the attach request 202 in response to receiving a broadcast message from the eNodeB 104, e.g., a System Information Broadcast. In certain instances, the attach request 202 indicates to the eNodeB 104 that the UE 102 is capable of using a particular Radio Access Technology (RAT), e.g., a 5G New Radio (NR) RAT. In other instances, the attach request 202 omits an indication that the UE 102 is capable of using the particular RAT. The eNodeB 104 may be part of a first radio bearer for data transmitted to and from the UE 102.

In response to receiving the attach request 202 from the UE 102, the eNodeB 104 may initiate the creation of an initial Evolved Packet System (EPS) bearer for the UE 102 by transmitting an initial bearer request 204 to the MME 112. The initial EPS bearer may include, or at least utilize, a radio bearer that includes the eNodeB 104. In some instances, the initial bearer request 204 includes the attach request 202. For example, the initial bearer request 204 may include an S1-MME control message.

The MME 112, in turn, may transmit an establish bearer request 206 to the SAEGW 118. The establish bearer request 206 may include multiple messages transmitted from the MME 112 to the SAEGW 118. For example, the establish bearer request 206 can include a create session request. In some embodiments, the establish bearer request 206 informs the SAEGW 118 about the UE 102 and the eNodeB 104. For example, the establish bearer request 206 may include an identity of the UE 102 and an identity of the eNodeB 104. In some instances, a PGW within the SAEGW 118 creates a new entry in an EPS bearer context table corresponding to a SGW within the SAEGW 118.

In response, the SAEGW 118 may transmit an establish bearer response 208 to the MME 112. The establish bearer response 208 may confirm, to the MME 112, that a tunnel including the SAEGW 118 has been established through the Evolved Packet Core (EPC). That is, the establish bearer response 208 may indicate that an EPS bearer has been established. The establish bearer response 208 may further indicate that a PDN bearer has been established between a Wide Area Network (WAN) and the UE 102. That is, the establish bearer response 208 may confirm that the SAEGW 118 will automatically forward data destined for the UE 102 to the eNodeB 104, and that the SAEGW 118 will forward data from the UE 102 via the eNodeB 104 to the WAN.

The MME 112 may transmit bearer information 210 to the eNodeB 104. The bearer information may notify the eNodeB 104 of the identity of the SAEGW 118. In some embodiments, the bearer information 210 includes a create session response. The bearer information 210 may indicate to the eNodeB 104 that an initial PDN bearer has been created, for example.

The eNodeB 104 may transmit an initial bearer confirmation 212 to the UE 102. The initial bearer confirmation 212 may inform the UE 102 that the PDN bearer, which includes the EPS bearer that contains the SAEGW 118, has been established for the UE 102. In some embodiments, the initial bearer confirmation 212 includes a Radio Resource Control (RRC) connection reconfiguration message, an RRC direct transfer message, or both.

The UE 102 may transmit an attachment complete message 214 to the eNodeB 104. In some embodiments, the attachment complete message 214 includes an RRC connection reconfiguration complete message, a direct transfer message, or both. The eNodeB 104 may forward the attach complete message 214 to the MME 112.

The UE 102 may transmit and/or receive first data 216 to and from the WAN via the established PDN bearer, which includes the EPS bearer utilizing the gNodeB 104 and including the SAEGW 118. The first data 216 may include uplink data, downlink data, or both. In some embodiments, the first data 216 may include a message transmitted from the UE 102 to the eNodeB 104 that indicates the UE 102 is capable of receiving and/or transmitting data over the particular RAT, e.g., the 5G NR RAT.

Once the UE 102 can receive and transmit the first data 216, the UE 102 has an initial connection with the WAN. In some instances, this is known as an initial PDN connection. In some examples, this initial connection connects the UE 102 to the Internet.

Next, an IMS bearer for the UE 102 can be established. That is, a connection between the UE 102 and an IMS network may be established. The UE 102 may transmit an IMS connection request 218 to the eNodeB 104. The eNodeB may forward the IMS connection request 218 to the MME 112. In some instances, the IMS connection request 218 includes information identifying the IMS network, which can be prestored at the UE 102. For example, the IMS connection request 218 may include an Access Point Name (APN) associated with the IMS network.

In response to receiving the IMS connection request 218, the MME 112 may transmit a create session request 220 to the SAEGW 118. The create session request 220 may instruct the SAEGW 118 to establish a connection with the IMS network.

The SAEGW 118 may transmit a create session response 222 to the MME 112. In some instances, the create session response 222 includes information that can enable the UE 102 to connect to the IMS network. For example, the create session response 222 may include a Proxy-Call Session Control Function (P-CSCF) IP address associated with the IMS network.

The MME 112 may transmit an activate IMS bearer message 224 to the UE 102 via the eNodeB 104. The activate IMS bearer message 224 may include information that can enable the UE 102 to connect to the IMS network. In some instances, the IMS bearer message 224 may include information enabling the UE 102 to access voice services via the IMS network. The activate IMS bearer message 224 can include the P-CSCF IP address associated with the IMS network.

The established IMS bearer for the UE 102 may include the same components of the EPC used in the EPS bearer of the PDN bearer. That is, the IMS bearer may initially utilize the same eNodeB 104 and include the same SAEGW 118 as the PDN bearer.

The eNodeB 104 and/or the UE 102 may identify that the initial IMS bearer has been established when the activate IMS bearer message 224 is received from the MME 112. Upon identifying that the IMS bearer has been established, the UE 102 and or the eNodeB 104 can initiate activation of a second radio bearer including the gNodeB 106. In some cases, the EPS bearer may utilize the gNodeB 106, rather than the eNodeB 104, to transfer data over wireless resources between the EPC and the UE 102.

FIG. 2B illustrates signaling 200B for activating a second radio bearer according to various embodiments. Signaling 200B may occur after signaling 200A. Alternatively, signaling 200B can occur between the creation of the initial PDN bearer and the creation of the IMS bearer, e.g., before the IMS connection request 218 is transmitted by the UE 102.

In some instances, the UE 102 may transmit capability information 226 to the eNodeB 104. The capability information 226 may inform the eNodeB that the UE 102 is capable of exchanging data over a 5G New Radio (NR) Radio Access Technology (RAT). In some embodiments, the capability information 226 is omitted, and the eNodeB 104 may learn about the capabilities of the UE 102 through other means. For example, the initial attach request 202 may inform the eNodeB 104 that the UE 102 is 5G-capable.

The eNodeB 104 may transmit a second radio bearer activation request 228 to the MME 112. The second radio bearer activation request 228 may be a request to activate a second radio bearer including the gNodeB 106. That is, the second radio bearer activation request 228 may be a request to activate the second radio bearer, which can be utilized by the EPS bearer, such that wireless data is transmitted to and from the UE 102 by the gNodeB 106, rather than (or in addition to) the eNodeB 104.

In some embodiments, the eNodeB 104 transmits the second radio bearer activation request 228 to the MME 112 in response to receiving the indication that the IMS bearer activation has been at least partially completed. In some instances, the eNodeB 104 transmits the second radio bearer activation request 218 in response to receiving the capability information 226 from the UE 102. The second radio bearer activation request 228 may include an identification of the gNodeB 106. The second radio bearer activation request 228 may include an Evolved Universal Mobile Telecommunications System (UMTS) Terrestrial Radio Access Node (E-UTRAN) Radio Access Bearer (E-RAB) modification indication, for example.

The MME 112 may transmit a modify bearer request 230 to the SAEGW 118. The modify bearer request 230 may identify the existing EPS bearer to the SAEGW 118 (e.g., by identifying an identity of the UE 102 and/or the eNodeB 104) and may also identify the gNodeB 106. As a result of receiving the modify bearer request 230, the SAEGW 118 may alter and/or replace a record of the existing EPS bearer, in order to identify that data destined for the UE 102 should be transmitted to the gNodeB 106, rather than the eNodeB 104.

The SAEGW 118 may transmit a modify bearer response 232 to the MME 112. The modify bearer response 232 may confirm that the SAEGW's 118 record of the EPS bearer between the UE 102 and the SAEGW 118 utilizes the gNodeB 106 in addition to the eNodeB 104 and/or rather than the eNodeB 104.

The MME 112 may confirm to the eNodeB 104 that the second bearer activation is complete by transmitting a second radio bearer activation confirmation message 234 to the eNodeB 104.

Second data 236 may be transmitted through the modified EPS bearer. The second data 236 may be transmitted between the SAWGW 118 and the gNodeB 106, and between the gNodeB 106 and the UE 102. The second data 236 may be transmitted to and from the WAN along the PDN bearer, to and from the IMS network along the IMS bearer, or both. In some embodiments, the second data 236 includes an initial message indicating that the second radio bearer has been activated, wherein the message is transmitted from the SAEGW 118 to UE 102 via the eNodeB 104. Accordingly, the UE 102 may know to transmit wireless uplink data to the gNodeB 106, at least in certain cases.

As a result of the signaling 200A and 200B illustrated in FIGS. 2A and 2B, the UE 102 may access services via the particular RAT (e.g., the 5G NR RAT) utilized by the gNodeB 106. In addition, collisions at the MME 112, the SGW 114, and the PGW 116 can be avoided by staggering the activation of the IMS bearer and activation of the second radio bearer. For example, the activation of the IMS bearer and the activation of the second radio bearer can be decoupled in the time domain.

Figure 3:
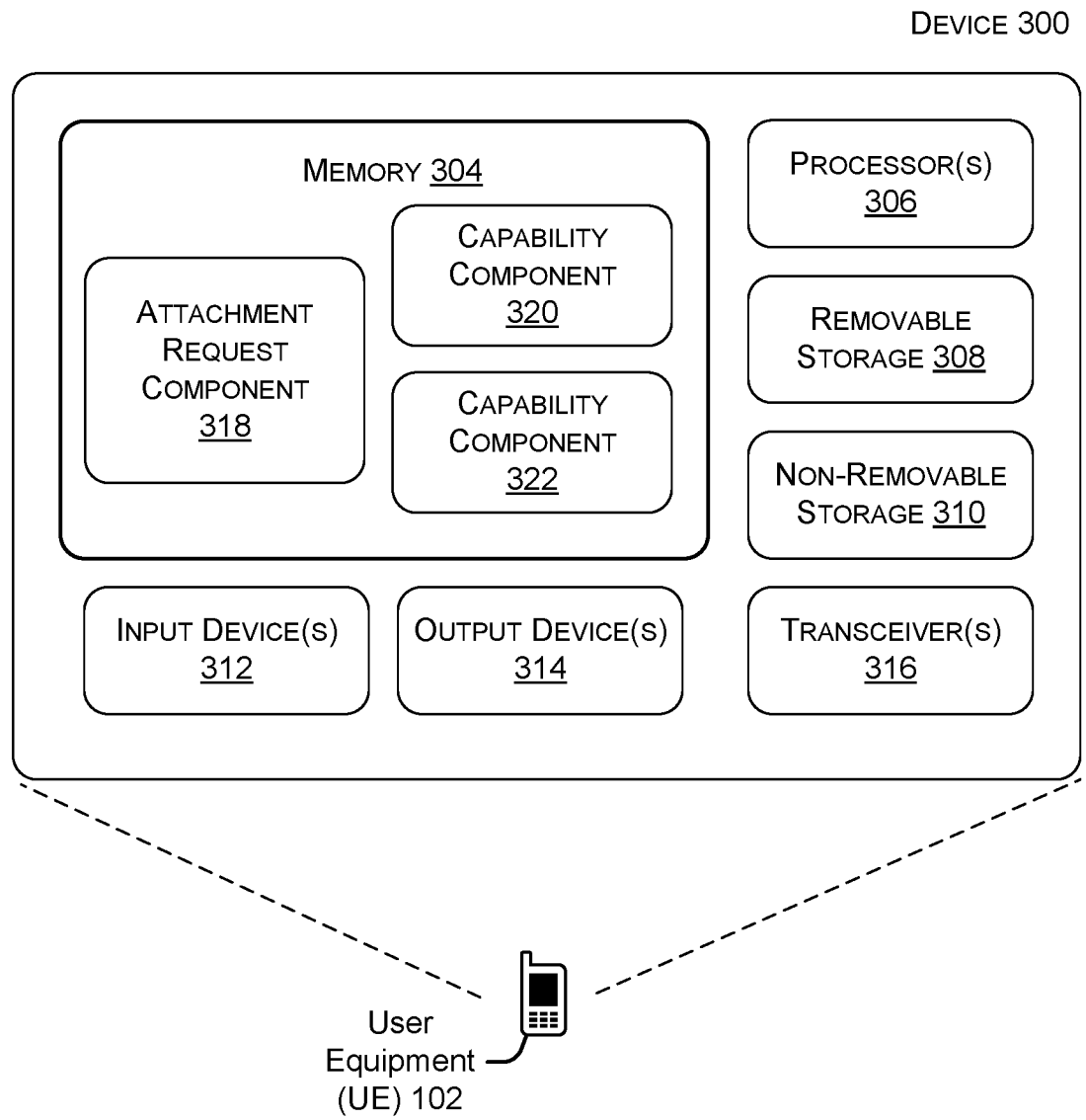
FIG. 3 is a diagram of a device that may correspond to a User Equipment (UE) in some embodiments.

FIG. 3 is a diagram of a device 300 that may correspond to a User Equipment (UE), e.g., UE 102, in some embodiments. Device 300 includes a memory 304, processor(s) 306, removable storage 308, non-removable storage 310, input device(s) 312, output device(s) 314, and transceiver(s) 316.

The memory 304 may include an attachment request component 318, an Internet Protocol (IP) Media Subsystem (IMS) connection request component 320, and a capability component 322. The attachment request component 318 may include instructions that, when executed by processor(s) 306, cause the processor(s) 306 to generate an attachment request and cause the transceiver(s) 316 to transmit the attachment request. The attachment request component 318 may instruct the transceiver(s) 316 to transmit the attachment request to a first base station, e.g., an eNodeB.

The IMS connection request component 320 may include instructions that, when executed by the processor(s) 306, cause the processor(s) 306 to generate an IMS connection request, and cause the transceiver(s) 316 to transmit the IMS connection request. The IMS connection request may identify a particular IMS network.

The capability component 322 may include instructions that, when executed by processor(s) 306, cause the processor(s) 306 to generate a capability indication and cause the transceiver(s) 316 to transmit the capability indication. The capability indication may be an indication that the transceiver(s) 316 are capable of transmitting and receiving data wirelessly using a particular Radio Access Technology (RAT), such as a 5G New Radio (NR) RAT. For example, the capability indication may be an indication that the device 300 is 5G-capable.

Figure 4:
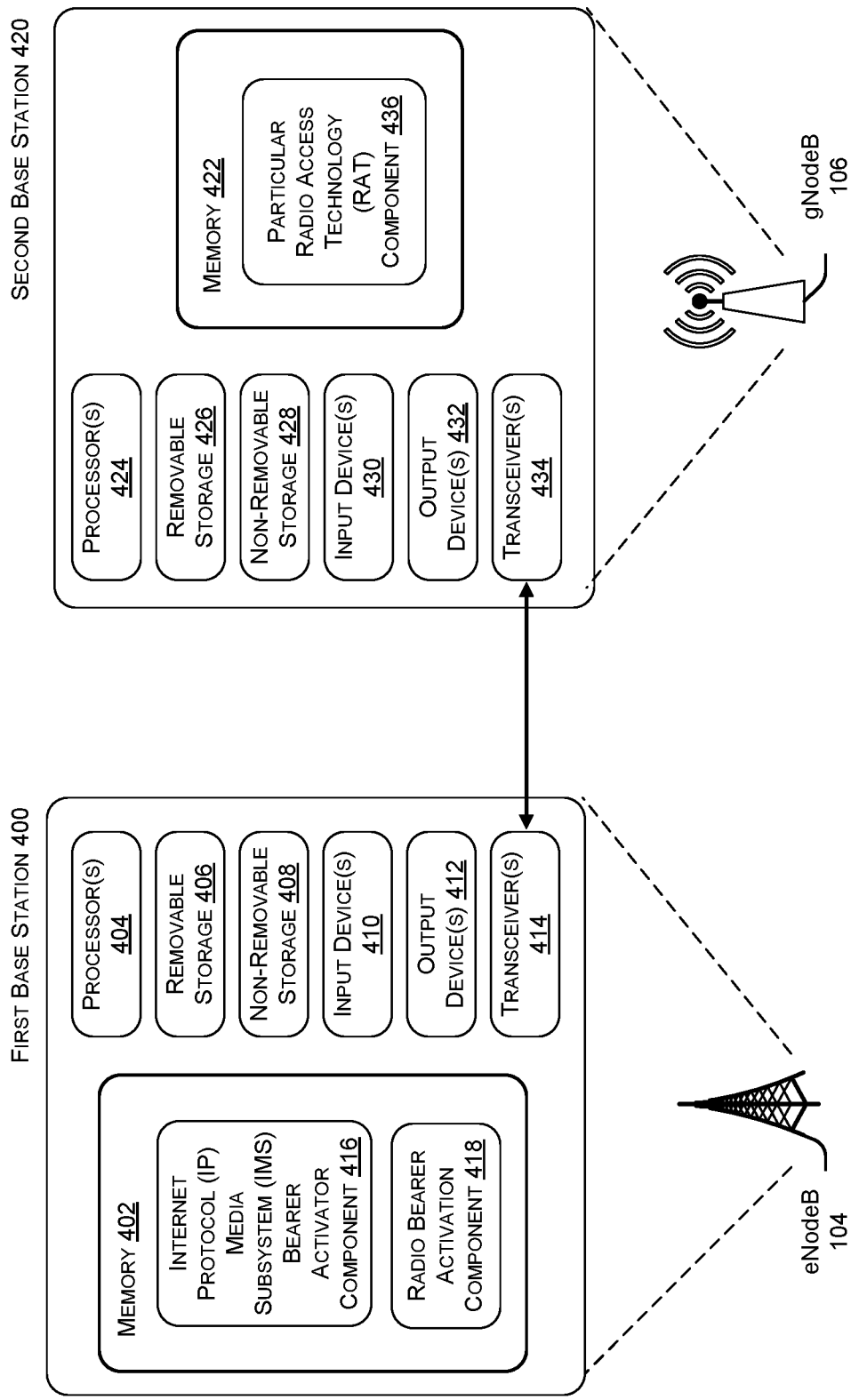
FIG. 4 is a diagram of a first base station and a second base station according to an embodiment.

FIG. 4 is a diagram of a first base station 400 and a second base station 420 according to an embodiment. The first base station 400 may be an eNodeB, e.g., eNodeB 104. The second base station 420 may be a gNodeB, e.g., gNodeB 106. Each one of the first base station 400 and the second base station 420 can include multiple devices.

The first base station 400 may include a memory 402, processor(s) 404, removable storage 406, non-removable storage 408, input device(s) 410, output device(s) 412, and transceiver(s) 414.

The memory 402 may include an IMS bearer activator component 416 and a radio bearer activation component 418. The IMS bearer activator component 416 may include instructions that, when executed by processor(s) 404, cause the processor(s) 404 to generate and/or forward a bearer request and cause the transceiver(s) 414 to transmit the bearer request to a component in an Evolved Packet Core (EPC), e.g., a Mobility Management Entity (MME). The bearer request may be received, by the transceiver(s) 414, from a UE, and may include an attachment request or an Internet Protocol (IP) Media Subsystem (IMS) connection request. The radio bearer activation component 418 may include instructions that, when executed by processor(s) 404, cause the processor(s) 404 generate a second radio bearer activation request and cause the transceiver(s) to transmit the second radio bearer activation request to a component in the EPC, e.g., the MME.

In various embodiments, the transceiver(s) 414 may be capable of transmitting and receiving data wirelessly over frequency bands associated with a first RAT, e.g., a 4G RAT. However, the transceiver(s) 414 may be incapable of transmitting and receiving data over frequency bands associated with a second RAT, e.g., a 5G New Radio (NR) RAT.

The second base station 420 may include a memory 422, processor(s) 424, removable storage 426, non-removable storage 428, input device(s) 430, output device(s) 432, and transceiver(s) 434.

The memory 422 may include a particular RAT component 336 including instructions that, when executed by processor(s) 424, cause the processor(s) 424 to convert data to and from a format suitable for transmission over the second RAT, and cause the transceiver(s) 434 to transmit data over the second RAT. In various embodiments, the transceiver(s) 434 may be capable of transmitting and receiving data wirelessly over frequency bands associated with the second RAT, which may be the 5G NR RAT.

The first base station 410 may be configured to control the second base station 420, such that the first base station 410 and the second base station 420 have a master-slave relationship. In some embodiments, a communication link may connect the transceiver(s) 414 of the first base station 400 to the transceiver(s) of the second base station 434.

In some embodiments, each one of memory 304, memory 402, and memory 422, is volatile (such as RAM), non-volatile (such as ROM, flash memory, etc.) or some combination of the two. Further, each of the device 300, the first base station 400, and the second base station 420 may also include additional data storage devices (removable and/or non-removable) such as, for example, magnetic disks, optical disks, or tape. Such additional storage is illustrated by, for example, removable storage 308, removable storage 406, removable storage 426, non-removable storage 310, non-removable storage 408, and non-removable storage 428. Tangible computer-readable media can include volatile and non-volatile, removable and non-removable media implemented in any method or technology for storage of information, such as computer readable instructions, data structures, program modules, or other data. The memory 304, memory 402, memory 422, removable storage 308, removable storage 406, removable storage 426, non-removable storage 310, non-removable storage 408, and non-removable storage 428 can all be examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information. Any such tangible computer-readable media can be part of any of the device 300, the first base station 400, and/or the second base station 420.

In some embodiments, each one of processor(s) 306, processor(s) 404, and processor(s) 424 includes a central processing unit (CPU), a graphics processing unit (GPU), or both CPU and GPU, or other processing unit or component known in the art.

In some embodiments, each one of input device(s) 312, input device(s) 410, and input device(s) 430 can include any of a keypad, a cursor control, a touch-sensitive display, voice input device, etc., and each one of output device(s) 314, output device(s) 412, and output device(s) 434 can include any of a display, speakers, printers, etc. These devices are well known in the art and need not be discussed at length here.

In some embodiments, each one of transceiver(s) 316, transceiver(s) 414, and transceiver(s) 434 can include a network interface card (NIC), a network adapter, a LAN adapter, or a physical, virtual, or logical address to connect to various networks, devices, or components. To increase throughput when exchanging wireless data, each one of transceiver(s) 316, transceiver(s) 414, and transceiver(s) 434 can utilize multiple-input/multiple-output (MIMO) technology. Each one of transceiver(s) 316, transceiver(s) 414, and transceiver(s) 434 can comprise any sort of wireless transceivers capable of engaging in wireless, radio frequency (RF) communication. Each one of transceiver(s) 316, transceiver(s) 414, and transceiver(s) 434 can also include other wireless modems, such as a modem for engaging in Wi-Fi, WiMAX, Bluetooth, infrared communication, and the like.

FIGS. 5 through 8 illustrate example processes in accordance with embodiments of the present disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel, and can be performed multiple times, to implement the processes.

Figure 5:
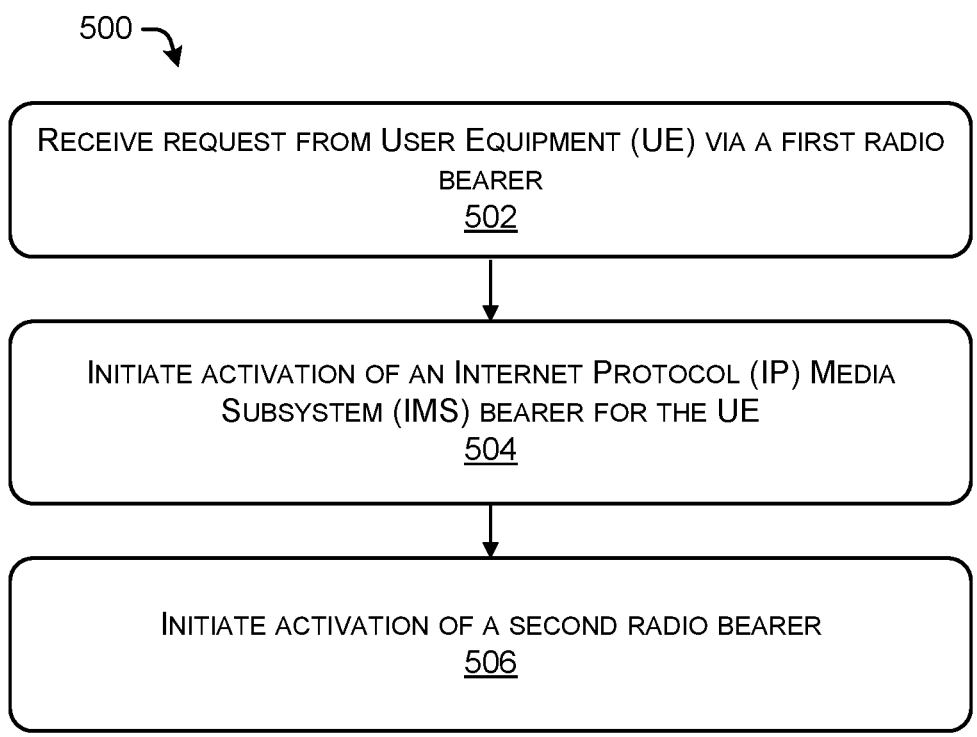
FIG. 5 illustrates an example process for performing staggered Internet Protocol (IP) Media Subsystem (IMS) bearer activation and radio bearer activation, in accordance with various embodiments of the present disclosure.

FIG. 5 illustrates an example process 500 for performing staggered IMS bearer activation and second radio bearer activation, in accordance with various embodiments of the present disclosure. Process 500 may be performed by a first base station, e.g., first base station 400.

At operation 502, a request is received from a User Equipment (UE) via a first radio bearer. In some embodiments, the request is an attach request, e.g., attach request 202. The attach request may be received over a wireless link, for example. The wireless link may be part of the first radio bearer, which may utilize a first Radio Access Technology (RAT), such as a 4G LTE RAT. The first radio bearer may include the first base station. The attach request may indicate that the UE is requesting to attach to a network. In some instances, the attach request includes an indication that the UE is capable of using a second RAT, such as a 5G NR RAT. In other instances, the attach request may omit the indication.

In some embodiments, the request is an Internet Protocol (IP) Media Subsystem (IMS) connection request, e.g., IMS connection request 218. The request may indicate a particular IMS network.

At operation 504, activation of an IMS bearer for the UE is initiated. Operation 504 can be performed in response to receiving the request at operation 502. In some examples, the activation of the IMS bearer is initiated by transmitting a message to a Mobility Management Entity (MME). In some instances, the message is the IMS connection request 218.

In various embodiments, an Evolved Packet System (EPS) bearer has already been created for the UE. For example, the EPS bearer may be part of an existing Packet Data Network (PDN) bearer by which the UE can receive services from the Internet, or some other WAN.

In response to initiating the IMS bearer, the MME and other components of an Evolved Packet Core (EPC) can establish the IMS bearer. In various embodiments, IMS bearer includes the existing EPS bearer. The EPS bearer includes a System Architecture Evolution Gateway (SAEGW), which may include a Serving Gateway (SGW) and a Packet Data Network (PDN) Gateway (PGW). The EPS bearer may further include, or at least utilize, the first radio bearer including the first base station.

At operation 506, activation of a second radio bearer is initiated. The initial EPS bearer may include the SGW and the PGW in the EPC and may utilize the first radio bearer containing the first base station. In various embodiments, the first base station may be configured to use a first RAT (e.g., a 4G RAT). The first base station may learn that the UE is capable of using a second RAT (e.g., a 5G NR RAT), and the first base station may be incapable of using the second RAT. In some embodiments, the second RAT corresponds to wireless bands with higher frequencies than wireless bands corresponding to the first RAT.

The second radio bearer may include the second base station. Activating the second radio bearer may enable the UE to receive services from a WAN (over the PDN bearer) or the IMS network (over the IMS bearer) via the second RAT.

In some instances, operation 506 includes transmitting a message, e.g., second radio bearer activation request 228, to the MME requesting the activation of the second radio bearer that includes the second base station. The message may include an identifier associated with the second base station. In response, the MME may transmit a message to one or more elements of the EPC to activate the second radio bearer between the UE and the EPC. For example, the MME may transmit a modify bearer request, e.g., modify bearer request 230, to the SAEGW. The SAEGW may transmit a message, e.g., modify bearer response 232, back to the MME indicating that the second radio bearer has been activated. In turn, the MME may inform the first base station that the second radio bearer has been activated by transmitting a message, e.g., confirmation 224, to the first base station.

As a result of the activation of the second radio bearer, the second base station may be configured to transmit data wirelessly to the UE using the second RAT. In some cases, the first radio bearer may only be utilized by the EPS bearer when the second radio bearer is disconnected, or the UE is out of range of the second base station. Otherwise, the second base station may carry data, e.g., second data 236, transmitted between the EPC and the UE using the second RAT.

In various embodiments, operation 506 can be performed at a time after operation 504. In some embodiments, operation 506 is performed a predetermined period of time after operation 504. The predetermined period of time may be, for example, derived from past measurements taken of initial IMS bearer setup procedures. In a specific example, the predetermined period of time could be 1 second.

In some embodiments, operation 506 is performed in response to receiving an indication that the IMS bearer has been established. In certain embodiments, the indication can be part of a message confirming that the IMS bearer has been established. This message can be received from any of the MME, the UE, or the SGW. For example, the MME may transmit an activate IMS bearer message, e.g., activate IMS bearer message 224, to the UE via the first base station, which may inform the first base station that the IMS bearer has been established.

In some instances, operation 506 is performed in response to receiving an indication that the UE is capable of using the second RAT. For example, the UE may wait to indicate that the UE is second RAT-capable until receiving a message, e.g., IMS bearer message 224, from the first base station confirming that the IMS bearer has been established. In some examples, the message can be in data, e.g., first data 216, received from the first base station.

In various embodiments, operation 506 is performed after the IMS bearer is initially established. Accordingly, collisions between messages received by elements of the EPC can be avoided.

Figure 6:
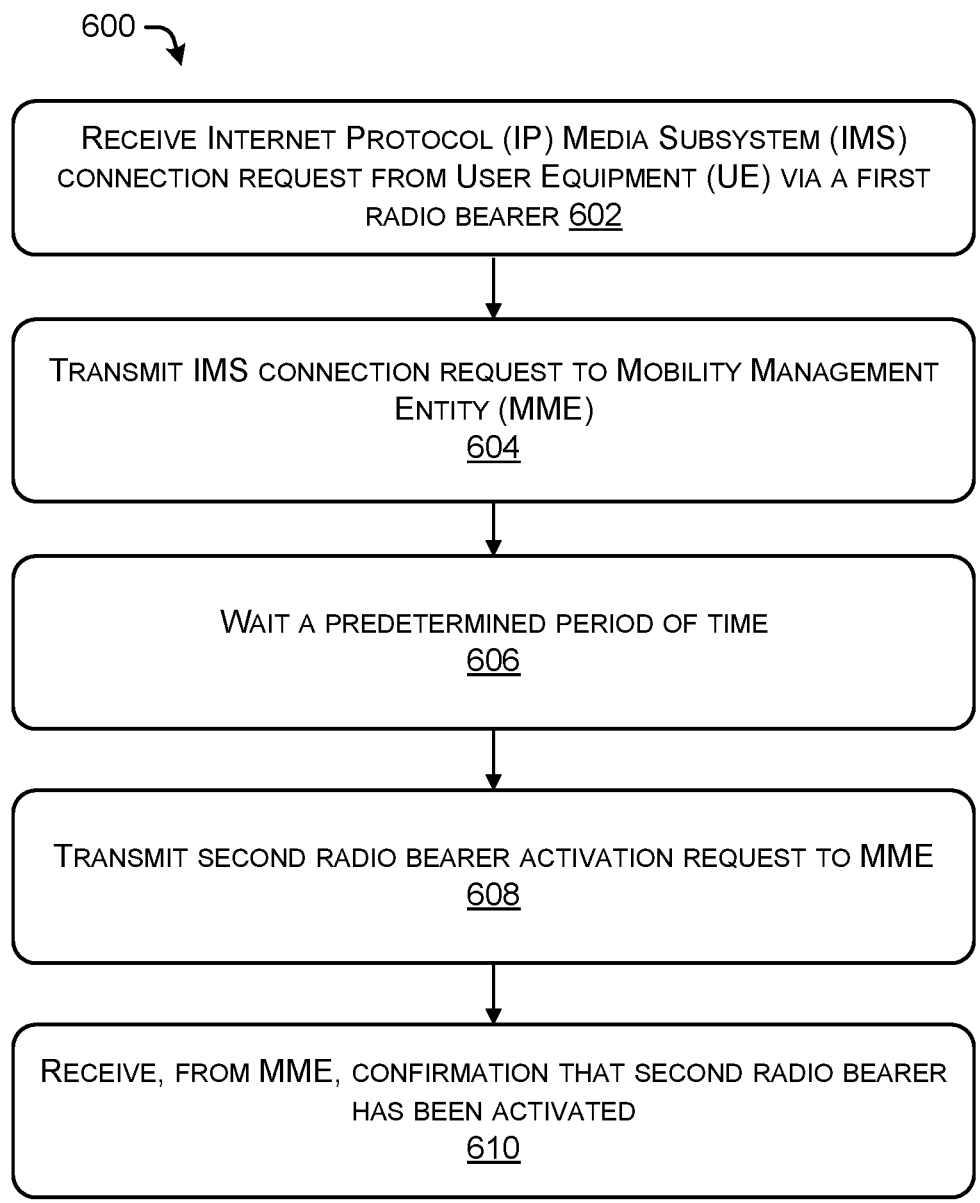
FIG. 6 illustrates an example process for performing staggered IMS bearer activation and radio bearer activation by waiting a predetermined period of time, in accordance with embodiments of the present disclosure.

FIG. 6 illustrates an example process 600 for performing staggered IMS bearer activation and second radio bearer activation by waiting a predetermined period of time, in accordance with embodiments of the present disclosure. Process 600 may be performed by a first base station, e.g., first base station 400. Process 600 may occur after an initial Packet Data Network (PDN) bearer is established between a User Equipment (UE) and a Wide Area Network (WAN). The PDN bearer may include an Evolved Packet System (EPS) bearer that traverses an Evolved Packet Core (EPC).

At operation 602, an Internet Protocol (IP) Media Subsystem (IMS) connection request is received from the UE via a first radio bearer. The request may indicate a particular IMS network. In some embodiments, IMS connection request can be, e.g., IMS connection request 218. The first radio bearer that may include a wireless link between the UE and the first base station. The first radio bearer may utilize a first Radio Access Technology (RAT), e.g., a 4G LTR RAT.

At operation 604, the IMS connection request is transmitted to a Mobility Management Entity (MME). The IMS connection request may initiate the creation of an IMS bearer connecting the UE to an IMS network. In response to initiating the activation of the IMS bearer, the MME and other components of the EPC can establish the IMS bearer. The IMS bearer may include the EPS bearer included in the PDN bearer.

Operation 606 includes waiting a predetermined period of time. In some instances, the predetermined period of time is stored in a local memory. In certain embodiments, the predetermined period of time is prescribed according to an update received from a carrier network. The predetermined period of time may be an average time it has taken for an IMS bearer to be established, for example, based on historic trends. In a specific example, the predetermined period of time is about 1 second to 3 seconds. The predetermined period of time may elapse as the MME and other components of the EPC are establishing IMS bearer.

At operation 608, a second radio bearer activation request may be transmitted to the MME. Operation 608 may occur after the predetermined period of time has passed. The bearer second radio bearer activation request may initiate activation of a second radio bearer including a second base station (e.g., a gNodeB). The second radio bearer may utilize a second RAT, e.g., a 5G NR RAT. In some instances, the bearer second radio bearer activation request includes second radio bearer activation request 228, for example.

At operation 610, a confirmation that the second radio bearer has been activated may be received from the MME. For example, in response to receiving an indication that the second radio bearer has been activated, e.g., modify bearer response 232, from a System Architecture Evolution Gateway (SAEGW), the MME may transmit a confirmation message, e.g., second radio bearer activation confirmation message 234, to the device(s) performing process 600.

Once the second radio bearer has been activated, data, e.g., second data 236, may be exchanged between the UE and the SAEGW via the second base station. In some embodiments, the second base station may be capable of transmitting and receiving data via a particular RAT (e.g., a 5G NR RAT) that the first base station may be incapable of utilizing. Once the second base station is included, or at least utilized, by the EPS bearer, the second base station may use the specific RAT to transmit data wirelessly to the UE and receive data wirelessly from the UE.

Figure 7:
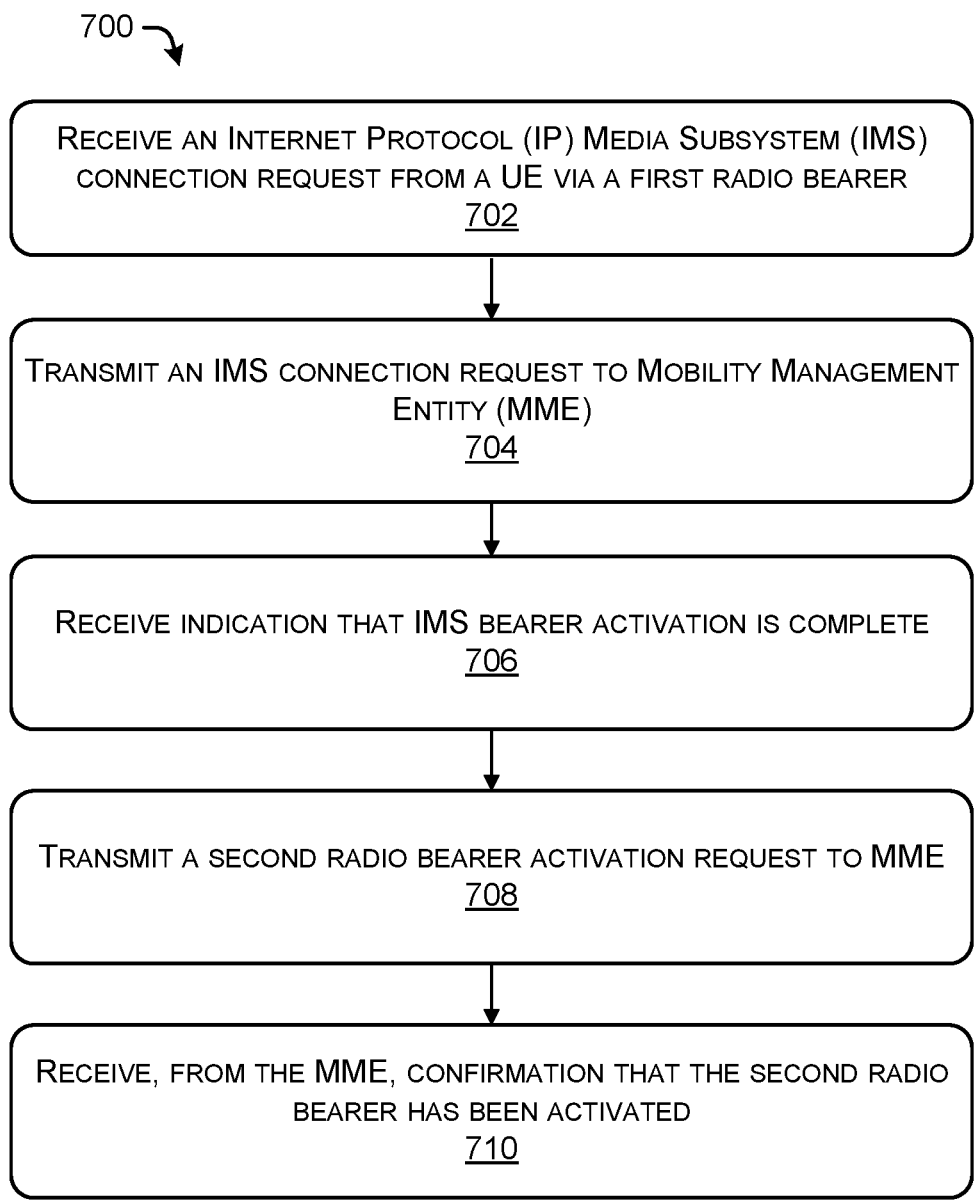
FIG. 7 illustrates an example process for performing staggered IMS bearer activation and radio bearer activation by initiating radio bearer activation upon receiving an indication that default bearer activation is complete, in accordance with some embodiments of the present disclosure

FIG. 7 illustrates an example process 700 for performing staggered IMS bearer activation and second radio bearer activation by initiating the second radio bearer activation upon receiving an indication that default bearer activation is complete, in accordance with some embodiments of the present disclosure. Process 700 may be performed by a first base station, e.g., first base station 400. Process 700 may occur after an initial Packet Data Network (PDN) bearer is established between a User Equipment (UE) and a Wide Area Network (WAN). The PDN bearer may include an Evolved Packet System (EPS) bearer that traverses an Evolved Packet Core (EPC).

At operation 702, an Internet Protocol (IP) Multimedia Subsystem (IMS) connection request is received from the UE via a first radio bearer. The request may indicate a particular IMS network. In some embodiments, IMS connection request can be, e.g., IMS connection request 218. The IMS connection request may be received over a wireless link that is included in the first radio bearer.

At operation 704, the IMS connection request is transmitted to a Mobility Management Entity (MME). The IMS connection request may initiate the activation of an IMS bearer through the EPC. In response to the IMS connection request, the MME and other components of the EPC can establish the IMS bearer. The IMS bearer may include the EPS bearer included in the PDN bearer.

At operation 706, an indication that the IMS bearer activation is complete is received. In certain embodiments, the indication can be part of a message confirming that the IMS bearer has been established. This message can be received from the MME or the UE. For example, the MME may transmit a message including an activate IMS bearer message, e.g., activate IMS bearer message 224.

At operation 708, a second radio bearer activation request may be transmitted to the MME. The second radio bearer activation request may initiate activation of a second radio bearer, which may include a second base station (e.g., a gNodeB). Operation 708 may be performed in response to receiving the indication that the IMS bearer activation is complete.

At operation 710, a confirmation that the second radio bearer has been activated may be received from the MME. For example, in response to receiving an indication that the second radio bearer has been activated, e.g., modify bearer response 232, from a Systems Architecture Evolution Gateway (SAEGW), the MME may transmit a confirmation message, e.g., confirmation 224, to the device(s) performing process 700.

Once the second radio bearer has been activated, data, e.g., second data 226, may be exchanged between the UE and the WAN and/or the IMS network via the second base station. In some embodiments, the second base station may be capable of transmitting and receiving data via a specific RAT (e.g., a 5G NR RAT) that the first base station is incapable of utilizing. Once the second base station is included, or at least utilized, by the EPS bearer, the second base station may use the specific RAT to transmit data wirelessly to the UE and receive data wirelessly from the UE.

Figure 8:
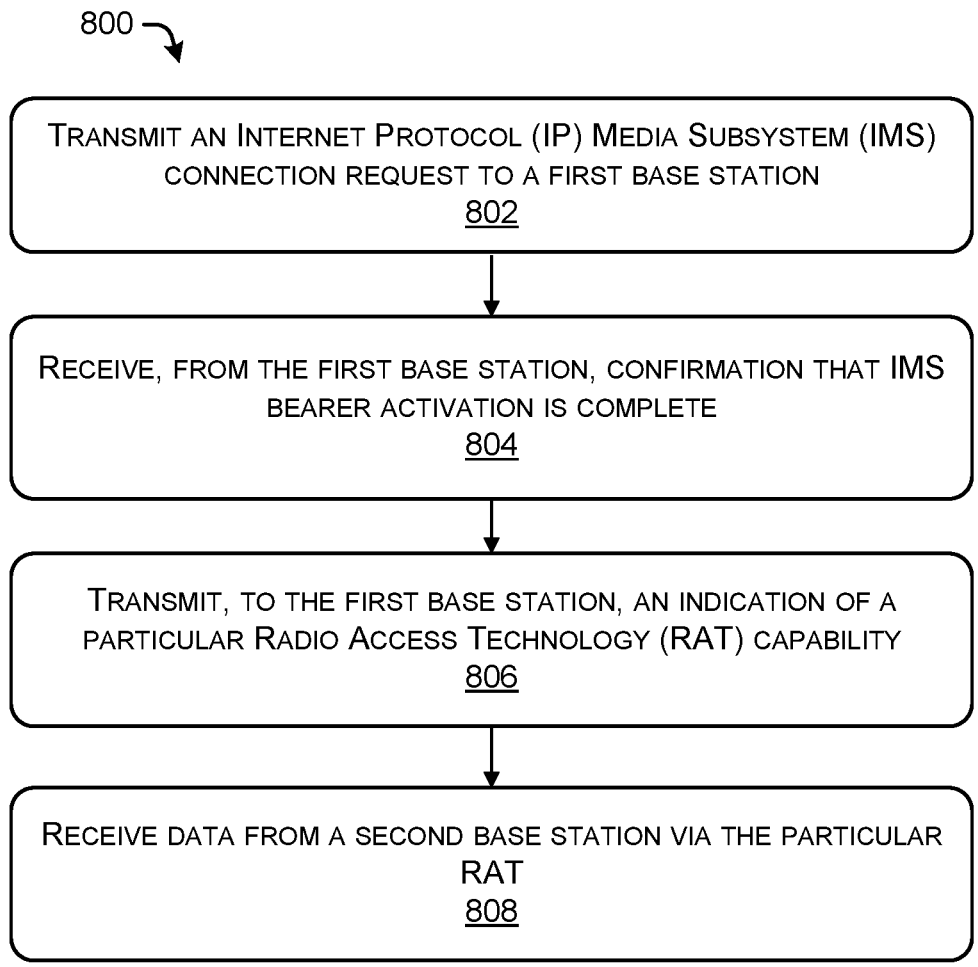
FIG. 8 illustrates an example process for performing staggered IMS bearer activation and radio bearer activation by waiting to transmit an indication of a particular Radio Access Technology (RAT) capability until receiving a confirmation that bearer activation is complete, in accordance with some embodiments of the present disclosure.

FIG. 8 illustrates an example process 800 for performing staggered IMS bearer activation and second radio bearer activation by waiting to transmit an indication of a particular Radio Access Technology (RAT) capability until receiving a confirmation that IMS bearer activation is complete. Process 800 may be performed by a User Equipment (UE), e.g., UE 102. In some instances, process 800 is performed after an initial Packet Data Network (PDN) bearer is established between the UE and a Wide Area Network (WAN). The PDN bearer may include an Evolved Packet System (EPS) bearer that traverses an Evolved Packet Core (EPC).

At operation 802, an IMS connection request is transmitted to a first base station. The IMS connection request may specify a particular IMS network, e.g., by including an Access Point Name (APN) associated with the IMS network. The IMS connection request may be transmitted to the first base station over a first radio bearer utilizing a first RAT.

In some instances, the first base station is a base station that is capable of transmitting and receiving data wirelessly using the first RAT, but not a second RAT. However, the first base station may be configured to control a second base station that is capable of transmitting and receiving data wirelessly using the second RAT. For example, the first base station may be an eNodeB and the second base station may be a gNodeB.

In certain embodiments, upon receiving the IMS connection request, the first base station may initiate IMS bearer activation for the UE, e.g., initiate activation of an IMS bearer utilizing the EPS bearer. The first base station may transmit one or more messages (e.g., the IMS connection request 218) to components of the EPC, in order to set up a bearer of data through the EPC between the UE and the IMS network.

At operation 804, a confirmation that the IMS bearer activation is complete is received from the first base station. The confirmation may indicate that data can now be exchanged with the IMS network via the IMS bearer including the initial EPS bearer (e.g., utilizing the first base station and including a particular Serving Gateway (SGW) and a particular Packet Data Network (PDN) Gateway (PGW)). In some embodiments, the confirmation can include an activate IMS bearer message, e.g., activate IMS bearer message 224.

At operation 806, an indication of a particular RAT capability is transmitted to the first base station. Operation 806 may be performed in response to receiving the confirmation that the IMS bearer activation is complete. The indication can be in the form of capability information, e.g., capability information 226. The indication may inform the base station that the UE is capable of transmitting and/or receiving data wirelessly using a 5G NR RAT.

The indication of the particular RAT capability may cause the first base station to initiate activation of the second radio bearer for the UE. In some embodiments, the first base station may be incapable of transmitting or receiving data wirelessly using the 5G NR RAT, but a second base station under control of the first station may be capable of transmitting and receiving data wirelessly using the 5G NR RAT. The first base station may initiate activation of the second radio bearer, which may include the second base station, by transmitting a message to the EPC, e.g., second radio bearer activation request 228.

At operation 808, data may be received from the second base station via the particular RAT. In various embodiments, the data originates from the WAN and traverses the EPC through the SGW and the PGW in the initial EPS bearer for the UE. The data may be received wirelessly from the second base station via a wireless band that is 5G-specific. For example, the data may be received via a particular frequency band, which includes a higher frequency than the maximum frequency over which the first base station can communicate.

Following process 800, the UE may be capable of exchanging data with the WAN and the IMS network via an EPS bearer that includes the SGW and the PGW. The UE may further be capable of exchanging data with the WAN and the IMS network via a radio bearer that includes the second base station and that is connected to the EPS bearer.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   receiving by a first base station, from a User Equipment (UE), an Internet Protocol (IP) Media Subsystem (IMS) connection request;
   initiating, by the first base station, activation of an IMS bearer for the UE, the IMS bearer utilizing a first radio bearer including the first base station, the first base station being configured to use a first Radio Access Technology (RAT);
   waiting, by the first base station, for a predetermined period of time after initiating the activation of the IMS bearer; and
   in response to initiating the activation of the IMS bearer and after waiting for the predetermined period of time, initiating, by the first base station, activation of a second radio bearer including a second base station that is configured to use a second RAT corresponding to a higher frequency than the first RAT, the IMS bearer utilizing the second radio bearer,
   wherein the first RAT and the second RAT form a non-standalone (NSA) network and the first radio bearer remains active while the second radio bearer is active.

2. The method of claim 1, wherein initiating the activation of the IMS bearer for the UE comprises forwarding the IMS connection request to a Mobility Management Entity (MME).

3. The method of claim 1, wherein the IMS bearer includes an EPS bearer that comprises a Serving Gateway (SGW) and a Packet Data Network (PDN) Gateway (PGW).

4. The method of claim 1, wherein the method further comprises:
   determining that the activation of the IMS bearer is complete.

5. The method of claim 4, wherein determining that the activation of the IMS bearer is complete comprises receiving, from the UE, an indication that the UE is 5G-capable, and
   wherein the second RAT is a 5G New Radio (NR) RAT.

6. The method of claim 1, wherein activating the second radio bearer comprises transmitting, to a Mobility Management Entity (MME), a request to activate the second radio bearer.

7. The method of claim 6, further comprising:
   receiving, from the MME, a response confirming second radio bearer has been activated.

8. The method of claim 1, wherein the first base station is an eNodeB configured to use a 4G RAT, and the second base station is an gNodeB configured to use a 5G New Radio (NR) RAT.

9. The method of claim 1, wherein the first RAT is a 4G RAT and the second RAT is a 5G New Radio (NR) RAT, and
   wherein the first base station is incapable of transmitting data to the UE using the 5G NR RAT.

10. A first base station, comprising:
    one or more processors;
    a memory; and
    one or more components stored in the memory and executable by the one or more processors to perform operations comprising:
       receiving, from a User Equipment (UE), an Internet Protocol (IP) Media Subsystem (IMS) connection request;
       initiating activation of an IMS bearer for the UE, the IMS bearer utilizing a first radio bearer including the first base station, the first base station being configured to use a first Radio Access Technology (RAT);
       waiting for a predetermined period of time after initiating the activation of the IMS bearer; and
       initiating, after waiting for the predetermined period of time, activation of a second radio bearer including a second base station that is configured to use a second RAT corresponding to a higher frequency than the first RAT, the IMS bearer utilizing the second radio bearer,
    wherein the first RAT and the second RAT form a non-standalone (NSA) network and the first radio bearer remains active while the second radio bearer is active.

11. The first base station of claim 10, wherein initiating the activation of the IMS bearer for the UE comprises forwarding the IMS connection request to a Mobility Management Entity (MME).

12. The first base station of claim 10, wherein the IMS bearer includes an EPS bearer comprises a Serving Gateway (SGW) and a Packet Data Network (PDN) Gateway (PGW).

13. The first base station of claim 10, wherein the operations further comprise:
    determining that the activation of the IMS bearer is complete.

14. The first base station of claim 13, wherein determining that the activation of the IMS bearer is complete comprises receiving, from the UE, an indication that the UE is 5G-capable, and
    wherein the second RAT is a 5G New Radio (NR) RAT.

15. The first base station of claim 10, wherein initiating the activation of the second radio bearer comprises transmitting, to a Mobility Management Entity (MME), a request to activate the second radio bearer, and
    wherein the operations further comprise receiving, from the MME, a response confirming that the second radio bearer has been activated.

16. The first base station of claim 10, wherein the first base station is an eNodeB configured to use a 4G RAT, and the second base station is an gNodeB configured to use a 5G New Radio (NR) RAT.

17. The first base station of claim 10, wherein the first RAT is a 4G RAT and the second RAT is a 5G New Radio (NR) RAT, and
  wherein the first base station is incapable of transmitting or receiving data using the 5G NR RAT.

* * * * *